Oct. 1, 1963 M. L. SCHULTZ ET AL 3,105,906

GERMANIUM SILICON ALLOY SEMICONDUCTOR DETECTOR FOR INFRARED RADIATION

Filed Nov. 24, 1959 2 Sheets-Sheet 1

INVENTORS
MELVIN L. SCHULTZ &
WILLIAM E. HARTY
BY
W.S. Hill
AGENT

INVENTORS
MELVIN L. SCHULTZ &
WILLIAM E. HARTY
BY
W.S. Hill
AGENT

United States Patent Office 3,105,906
Patented Oct. 1, 1963

3,105,906

GERMANIUM SILICON ALLOY SEMICONDUCTOR DETECTOR FOR INFRARED RADIATION

Melvin L. Schultz, Princeton, and William E. Harty, Trenton, N.J., assignors to Radio Corporation of America, a corporation of Delaware
Filed Nov. 24, 1959, Ser. No. 855,039
5 Claims. (Cl. 250—83.3)

This invention relates to improved semiconductive materials and devices which are sensitive to radiation; more particularly, to materials and devices which are sensitive to radiations in the infra-red range having a wavelength of about 8 to 14 microns.

Radiant energy may be detected by monitoring the conductivity of a semiconductive body, since the resistivity of a crystalline semiconductor decreases when radiation photons impinge thereon. The resistivity of a semiconductive crystal is strongly dependent upon the concentration of mobile charge carriers in the conduction band of the crystal energy levels. Radiation photons which impinge on a crystalline semiconductor impart sufficient energy to some charge carriers having energies in the valence band so as to raise their energy level across the bandgap to the conduction band, thus increasing the number of available charge carriers and strongly decreasing the resistivity of the semiconductor. The term "bandgap" refers to the gap or difference between the energies of charge carriers in the top of the valence energy band and the energies of charge carriers in the bottom of the conduction band. Between the valence energy band and the conduction energy band are the "forbidden" energy levels, i.e., those energy levels which are not occupied by charge carriers. The term "bandgap" will be employed herein to designate the energy required to raise an electron from the upper edge of the valence band to the lower edge of the conduction band.

It is readily seen that in order to increase the amount of carriers in the conduction band, the energy of the radiation photons impinging on the semiconductor body must be at least equal to the bandgap. The energy required to raise the electrons across the bandgap is about 0.7 ev. in germanium, and about 1.1 ev. in silicon. The energy of radiation photons increases as the radiation wavelength decreases, and at room temperatures only electromagnetic radiation having a wavelength of about 1.8 microns and less contains sufficient energy to raise an electron through the 0.7 ev. bandgap of germanium. Similarly, only radiation of wavelengths less than about 1.2 microns contains sufficient energy to raise an electron through the 1.1 ev. bandgap of silicon.

Earth's atmosphere is quite transparent to electromagnetic radiation in several distinct portions of the spectrum. One such portion consists of radiation having a wavelength of about 8 to 14 microns, and the earth's atmosphere is generally said to have an infra-red window in this region of the spectrum. This window is of interest because room temperature objects radiate with peak emission in the 8 to 14 micron range. For example, heat radiation emitted by a living human body has a maximum intensity at a wavelength of about 10 microns. Such radiation falls within this infra-red window, and may be utilized for the detection of personnel. For maximum sensitivity and signal-to-noise ratio in the detection of infra-red radiation, it is desirable to utilize as the semiconductor body a material which is strongly affected only by radiation having a wavelength of about 8 to 14 microns. As indicated above, high bandgap materials are most sensitive to high energy or short wavelength radiations. For maximum sensitivity to radiations having a wavelength of about 8 to 14 microns, the semiconductive material should have a bandgap of only about 0.1 ev. at the temperature at which the semiconductive body is maintained.

Pure or intrinsic germanium is not satisfactory for infra-red detectors, since at room temperatures only radiation having a wavelength of about 1.8 microns and less will be effectively detected, while most of the infrared radiation passed by the atmosphere will have a wavelength in the 8 to 14 micron range. Pure silicon is even less useful for this purpose, since it will detect only radiation in the near infra-red region having a wavelength of about 1.2 microns and less. Radiation in the wavelength of about 1.8 microns or less is known as the near infra-red, while the radiation of interest, i.e., radiation having a wavelength of about 8 to 14 microns, is known as the far infra-red.

It is possible to incorporate foreign impurity atoms into a semiconductor crystal lattice so that energy differences other than the characteristic bandgap may be obtained. Such energy differences which are due to foreign impurity atoms are denoted as "localized energy levels," and are used to define the energy difference between the impurity centers and the edge of the valence or conduction band of the host semiconductive material in which the impurity is incorporated. The localized energy level may be established by incorporating in the semiconductor lattice a conductivity type-determining substance which is either a donor or an acceptor impurity. The energy level is a donor level if it possesses an ionizable electron which can be excited from the energy center into the conduction band; if the energy level can accept an electron from the valence band, it is referred to as an acceptor level.

Foreign impurity atoms introduced into a semiconductor material constitute impurity centers, and include charge carriers (electrons or holes) which are bound to the impurity center when not excited by externally applied energy. Localized energy levels between about 0.01 and 0.05 ev. are easily established in a germanium body by incorporating suitable impurity atoms in the germanium lattice. It will be appreciated that these are rather small energy differences, and thus radiant photons of low energy will be able to raise charge carriers to the valence or conduction bands. Since these energy differences (sometimes called ionization energies) are low, ambient thermal energy above about 50° K. is sufficient to ionize or excite charge carriers into the conduction band (in the case of electrons) or into the valence band (in the case of holes). It will be appreciated that with semiconductive materials having such localized energy levels established therein, it is difficult to determine whether excitation of the charge carriers is due to the effect of impinging infra-red radiation or to ambient thermal energy.

One means to overcome this difficulty is to cool a semiconductor such as germanium to temperatures below 40° K. and preferably to less than 10° K. Such cooling reduces the thermal energy of the material and deionizes the impurity centers; that is, the charge carriers are condensed back to the localized energy levels associated with the impurity centers. This permits the energy present in long wavelength infra-red radiation to raise the charge carriers through the relatively small energy gap of 0.01 to 0.05 ev. at low temperatures such as 10° K. A drawback of this method is that temperatures as low as 40° K. and lower are not readily attainable. The most practically attainable low temperatures are those which can be obtained with liquid nitrogen (about 50° K. to 77° K.). Hence in order to provide detection of far infra-red radiation with a semiconductor maintained at temperatures attainable with liquid nitrogen and still avoid the effects of ambient thermal energy, it is necessary to provide the semiconductor material with a localized energy level greater than those of 0.01 to 0.05 ev. mentioned heretofore. Semiconductor materials having a localized energy level of about 0.15 ev. for example, have been provided heretofore. However, it has been found that the peak photoconductive response for such semiconductors at 77° K. occurs at wavelengths less than 8 microns (usually about 5 microns), and the response of these materials falls off to values lower by at least one order of magnitude for radiation in the far infra-red 8 to 14 micron range.

It has been found that electromagnetic radiation of 8 to 14 microns wavelength contains enough energy to raise an electron through energy differences in the range of about 0.09 to 0.14 ev. at temperatures attainable with liquid nitrogen (about 50° K. to 77° K.). Hence it is desirable to provide a semiconductor material having a localized energy level in the range of 0.09 to 0.14 ev. Radiation of both 8 and 14 micron wavelengths contains sufficient energy to raise a charge carrier through an energy difference of 0.1 ev. It is therefore desirable to provide a semiconductor material having a localized energy level of about 0.1 ev. at temperatures attainable with liquid nitrogen.

It is also important to provide a material with a localized energy level lying in the range of 0.09 to 0.14 ev. because the intensity of radiation from low temperature sources such as the human body peaks in this energy region, and because the atmosphere is most transparent to infra-red radiation in this region.

Accordingly, it is an object of the instant invention to provide an improved semiconductor device which is sensitive to infra-red radiation.

Another object of the invention is to provide an improved semiconductor device which is particularly sensitive to radiation having a wavelength of about 8 to 14 microns.

Still another object of the invention is to provide an improved semiconductor material which exhibits an energy gap of between 0.09 and 0.14 ev.

Another object of the invention is to provide an improved photosensitive semiconductor device.

Still another object of the invention is to provide an improved infra-red detector having a greater photoconductive response in the long wavelength region of 8 to 14 microns than heretofore attainable.

But another object is to provide an improved semiconductor device which is sensitive to radiation of about 8 to 14 micron wavelength at temperatures attainable with liquid nitrogen.

Yet another object is to provide an improved semiconductor device having a localized energy level between about 0.09 and 0.14 ev. at readily attainable temperatures.

These and other objects and advantages of the invention are attained by incorporating in the crystal lattice of a semiconductive germanium-silicon alloy body, two conductivity type-determining substances, the first being an acceptor and the second a donor. The preferred acceptor is zinc, while the donor may be any element or mixture of elements selected from the group of elements consisting of phosphorus, arsenic, antimony and bismuth. The amount of donor substance in the alloy should be less than that which will completely compensate the zinc. The germanium-silicon alloy utilized may be either monocrystalline or polycrystalline, and preferably contains 1 to 10 atomic percent silicon, balance germanium. In order to establish a localized energy level of about 0.1 ev. when the body is maintained at temperatures available with liquid nitrogen, about $10^{14}$ to $10^{16}$ atoms per cubic centimeter of zinc are incorporated in the germanium-silicon body. The number of donor atoms incorporated in the germanium-silicon body depends on the number of acceptor atoms in the body, and is suitably at least equal to the number of zinc atoms present, but preferably less than twice the number of zinc acceptor atoms in the alloy. A semiconductive body thus formed of germanium-silicon alloy and maintained at about 50° K. to 77° K. exhibits an improved photoconductive response to infra-red radiations having a wavelength of 8 to 14 microns. A silicon content of about 4 to 8 atomic percent is particularly suitable for the detection of low temperature sources such as personnel.

The invention will be described in greater detail by reference to the accompanying drawing, in which.

MATERIALS

Figure 1:
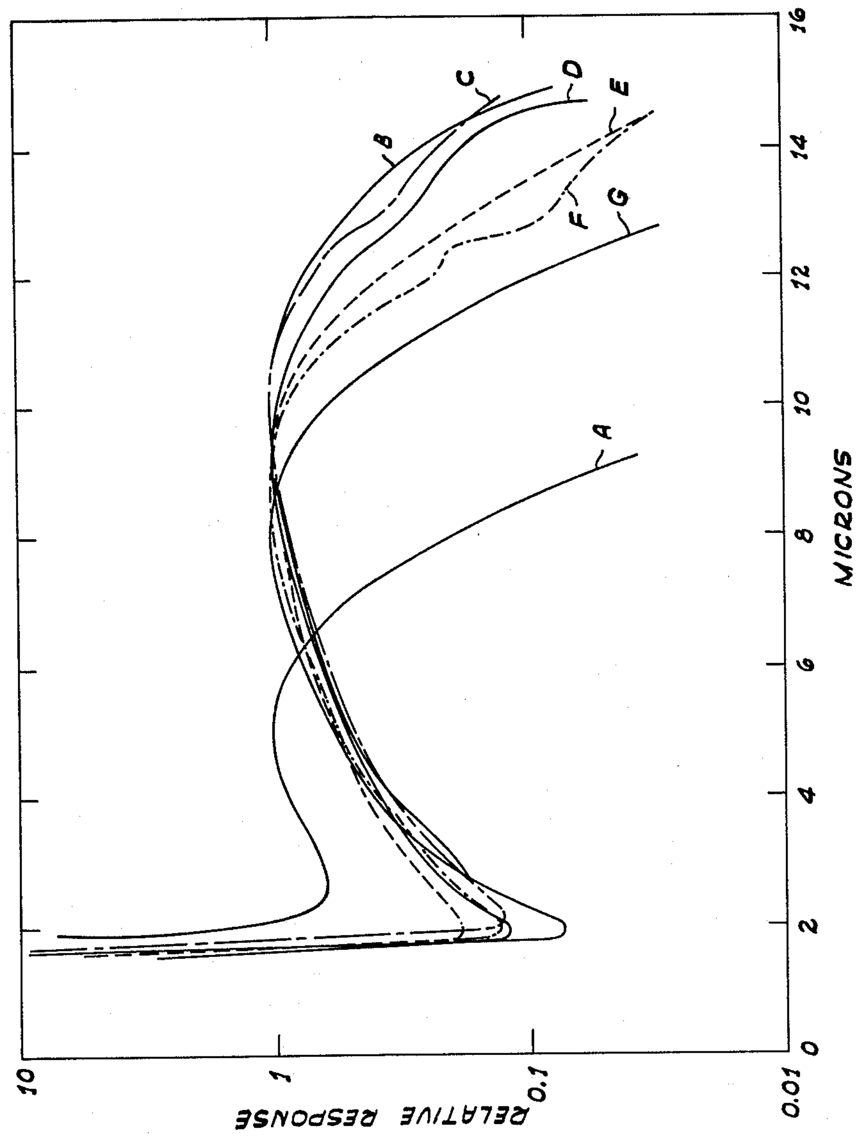
FIGURE 1 shows curves of the spectral response versus radiation wavelength for the semiconductive materials herein disclosed, as well as for a previously known semiconductive material.

In order to make infra-red detecting devices in accordance with the present invention, a series of novel alloys of germanium and silicon were prepared. While monocrystalline alloys are preferred, they are not essential since it has been found that both monocrystalline and polycrystalline alloys exhibit practically the same values for those properties which are of interest for infra-red detection. In the following table of zinc-doped germanium-silicon alloys which were partly compensated with a donor, the materials are all monocrystalline.

*Table I*

GERMANIUM-SILICON ALLOYS CONTAINING ZINC AND DONOR ATOMS

| Sample No. | Silicon Atomic Percent | Zinc Atoms Per cc. | Donor Atoms Per cc. | Ionization Energy in ev. |
|---|---|---|---|---|
| 1 | 1.1 | $2\times10^{15}$ | $3.5\times10^{15}$ (As) | .098 |
| 2 | 2.7 | $2.3\times10^{15}$ | $3.5\times10^{15}$ (Bi) | .103 |
| 3 | 3.3 | $5.4\times10^{15}$ | $9.4\times10^{15}$ (Sb) | .102 |
| 4 | 4.1 | $5.4\times10^{15}$ | $9.4\times10^{15}$ (As) | .106 |
| 5 | 4.4 | $6.5\times10^{15}$ | $9.5\times10^{15}$ (P) | .101 |
| 6 | 4.7 | $2.4\times10^{15}$ | $3.5\times10^{15}$ (Bi) | .112 |
| 7 | 4.9 | $6.5\times10^{15}$ | $9.4\times10^{15}$ (P) | .108 |
| 8 | 5.6 | $6.5\times10^{15}$ | $1.1\times10^{16}$ (Sb) | .116 |
| 9 | 5.9 | $2.4\times10^{15}$ | $3.5\times10^{15}$ (P) | .119 |
| 10 | 6.7 | $2.5\times10^{15}$ | $3.5\times10^{15}$ (Sb) | .113 |
| 11 | 6.8 | $2.5\times10^{15}$ | $3.5\times10^{15}$ (P) | .124 |
| 12 | 6.9 | $6.8\times10^{15}$ | $1.2\times10^{16}$ (Sb) | .119 |
| 13 | 7.2 | $6.4\times10^{15}$ | $8.6\times10^{15}$ (Sb) | .119 |
| 14 | 7.2 | $6.4\times10^{15}$ | $8.6\times10^{15}$ (Sb) | .117 |
| 15 | 7.3 | $6.6\times10^{15}$ | $8.6\times10^{15}$ (As) | .116 |
| 16 | 7.5 | $5.9\times10^{15}$ | $8.6\times10^{15}$ (Sb) | .124 |
| 17 | 7.7 | $2.8\times10^{15}$ | $3.5\times10^{15}$ (Sb) | .115 |
| 18 | 9.9 | $2.9\times10^{15}$ | $3.5\times10^{15}$ (Sb) | .138 |

The ionization energies in Table I were computed either by measuring the slope of the curve produced by plotting the log of the conductivity versus $1/T$, where T is absolute temperature, or from photoconductive spectral response curves. It will be seen that the ionization energy of the above zinc plus donor doped germanium-silicon alloys increases regularly with increasing silicon content of the alloys.

As discussed above, it is desirable to utilize a semiconductive material having an ionization energy of about 0.1 ev., since all the 8 to 14 micron wavelength radiations in the infra-red window have sufficient energy to raise a charge carrier through an energy difference of about 0.1 ev. Ionization energies substantially greater than 0.14 ev. required photons more energetic than those available in radiation of 14 microns wavelength. Ionization energies substantially less than 0.1 ev. must be cooled to temperatures lower than those available with liquid nitrogen in order to prevent spurious response due to ambient thermal energy. It has now been found that germanium-silicon alloys may be doped with zinc and partly compensated with an element of the group consisting of phosphorus, arsenic, antimony, and bismuth to establish ionization energies at the optimum value of about 0.1 ev. as shown.

According to one theoretical explanation of the above compensation phenomena, zinc alone produces two acceptor ionization levels in germanium, a shallow level of holes at .03 ev. above the upper edge of the valence band, and a deeper level of holes at .09 ev. above the upper edge of the valence band. The shallow level is undesirable, since it would introduce spurious response due to ambient thermal energy photons. The invention makes use of the fact that by incorporating into the crystal lattice sufficient donor atoms, the negative charge carriers (electrons) thus introduced pair with the .03 ev. positive charge carriers (holes) and thus fully "compensate" the shallow acceptor level. It is usually stated that the electrons "fill" the holes. While the deeper acceptor level at .09 ev. may be partly compensated by the negative charge carriers thus introduced, the amount of donor atoms incorporated in the crystal must not be so high as to fully compensate the deeper level, since such full compensation would make the semiconductor lose its induced sensitivity to infra-red radiaiton. In other words, a fully compensated semiconductor in which the holes and electrons are completely paired acts like an intrinsic semiconductor in this respect, i.e., acts like a highly pure semiconductor which contains neither acceptor nor donor impurities. For this reason, the concentration of donor atoms in the semiconductor should be less than twice the concentration of zinc atoms, since if twice as many donor atoms as zinc atoms were present, both the shallow ionization level at .03 ev. and the deeper ionization level at .09 ev. would be fully compensated. The addition of 1 to 10 atomic percent silicon to the material serves to shift the deeper acceptor level from .09 ev. to about .10 ev., which, as discussed above, is the preferred value in terms of sensitivity to radiation of 8 to 14 microns wavelength.

Different applications of infra-red sensing are best performed by different materials. For example, if it is intended to detect room temperature sources at relatively short distances such as 0.5 mile and less, then it is desirable to utilize a semiconductor which is highly sensitive to radiation in the range of about 8 to 14 microns wavelength. Sensitivity to radiation longer than 14 microns wavelength is not desired, since such sensitivity would merely introduce noise in the device. If it is intended to detect such low temperature sources at distances where the radiation has a relatively long path length, such as one mile and over, then it is desirable that the sensitivity of the semiconductor have an upper wavelength limit of about 11 to 12 microns. An important advantage of the instant invention is that the semiconductor materials described may be "tailored" for the required application either by varying the silicon content of the alloy, or by varying the compensation of the alloy, i.e., by varying the ratio of donor atoms to zinc atoms in the crystal lattice.

A figure of merit for the sensitivity of a radiation detecting material is known as the noise equivalent power, which is defined as the number of watts of radiation from a black body at 500° K. impinging on the detecting material crystal giving a signal-to-noise ratio equal to unity. This figure of merit varies with the temperature of the semiconductive material, hence this temperature is specified when reciting the noise equivalent power. The noise equivalent power is also dependent on the area of the crystal illuminated and on the bandwidth of the amplifier. The latter factor is generally computed for one cycle per second. The noise equivalent power for the composition corresponding to sample No. 3 in Table I above is $1.0 \times 10^{-11}$ watts at 50° K. This is the best sensitivity so far reported for an infra-red detector in the 8 to 14 micron wavelength region.

PHOTOCONDUCTIVE RESPONSE

Referring now to FIGURE 1, the photoconductive response of various semiconductor alloys is shown for different wavelengths in the infra-red range. Curve A shows the spectral response at temperatures available with liquid nitrogen (50° K. to 77° K.) for a previously known infra-red detector material consisting of germanium doped with both gold and arsenic. It will be noted that the response of this material is large for the shorter wavelengths less than 3 microns, but rapidly decreases for wavelengths greater than 8 microns. Curve B shows the photoconductive response at the same temperature range for a zinc and antimony doped germanium-silicon alloy according to the invention containing 3.3 atomic percent silicon, and corresponding in composition to sample No. 3. Curve C shows the photoconductive response of zinc and arsenic doped germanium-silicon alloy containing 4.1 atomic percent silicon and corresponding in composition to sample No. 4. Curve D shows the photoconductive response of zinc and phosphorus doped germanium-silicon alloy containing 4.9 atomic percent silicon and corresponding in composition to sample No. 7. Curve E shows the photoconductive response of zinc and antimony doped germanium-silicon alloy containing 5.6 atomic percent silicon and corresponding in composition to sample No. 8. Curve F shows the photoconductive response of zinc and antimony doped germanium-silicon alloy containing 6.9 atomic percent silicon and corresponding in composition to sample No. 12. Curve G shows the photoconductive response of zinc and antimony doped germanium-silicon alloy containing 7.5 atomic percent silicon and corresponding in composition to sample No. 16. It will be seen that the relative photoconductive response of the alloys according to the invention is greater than that of the gold-arsenic doped germanium by about an order of magnitude for wavelengths of 8 to 14 microns.

The curves in FIGURE 1 show the relative photoconductive response of the various alloys according to the invention at temperatures of 50° K. to 77° K. The photoconductive response of these materials at other temperatures is not shown, since a great many curves would be required, but it has been established that the sensitivity of response of these alloys increases as the temperature decreases. For example, the photoconductive response to infra-red radiations of sample No. 1 maintained at 4° K., the temperature of liquid helium, is about an order of magnitude greater than the response at 77° K. Hence, it will be readily appreciated that a superior radiation detector for wavelengths between 8 and 14 microns can be obtained with zinc doped germanium-silicon alloys herein disclosed when the germanium-silicon body is maintained at temperatures as low as 4° K.

PREPARATION AND DOPING OF GERMANIUM-SILICON ALLOYS

The zinc and donor doped germanium-silicon materials of the invention may be prepared by standard techniques of the semi-conductor materials art. Several methods are available for introducing the zinc and the donor impurities into the germanium-silicon alloys. For example, the impurities may be incorporated in a melt of germanium and silicon from which a crystal is grown; alternatively, the impurity may be diffused into a grown solidified crystalline body of alloyed germanium and silicon. Germanium-silicon crystals may be prepared and grown by the technique of contacting a seed crystal of either germanium or silicon to a melt of germanium and silicon, and slowly withdrawing the seed crystal. Single crystals of germanium-silicon alloy having any desired composition may be obtained by gradually adding silicon in increasingly larger amounts to a germanium melt while the crystal is being pulled from the molten mixture.

If horizontal crystal-growing techniques are preferred, one method is to place increasingly large pieces of silicon in contact with a germanium ingot along its length with the smallest portion of silicon being nearest the initially melted end of the germanium ingot, so that as a molten zone travels along the ingot, more and more silicon is gradually introduced into the melt and hence into the solidified crystal.

Figure 2:
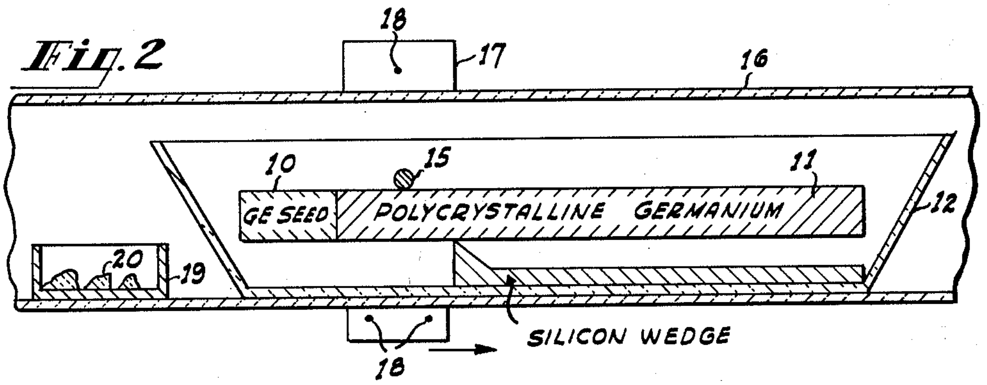
FIGURE 2 is a schematic, cross-sectional, elevational view of an arrangement illustrating a method of preparing germanium-silicon alloy bodies in accordance with the invention; and, FIGURE 3 is a schematic, cross-sectional, elevational view of an infra-red detector device utilizing the semiconductive materials herein disclosed.

Another horizontal crystal-growing technique is illustrated in FIGURE 2. A monocrystalline germanium seed 10 is placed next to a polycrystalline germanium ingot 11 in a silica-coated quartz boat 12. A silicon wedge 13 is positioned in the boat along side the germanium ingot 11 so that the thicker portion 14 of the wedge is about a zone length away from the seed crystal 10. The zone length is the length of the successive portions of ingot 11 which are subsequently molten, and in this example is about 2 inches. A small quantity of donor material 15 is placed on ingot 11 near seed crystal 10. In this example, the donor material 15 is a pellet of antimony weighing about 5 milligrams, the germanium ingot 11 weighs 150 grams, and the silicon wedge 13 weighs 2 grams. Boat 12 and its contents are placed in a quartz furnace tube 16 which is surrounded by a movable heater 17 containing three globars 18. The heater 17 is adjusted to raise the temperature of a 2 inch length of the ingot 11 to about 1000° C., thus forming a molten zone about 2 inches long. The heater is moved by suitable means in the direction of the arrow at the rate of 2 millimeters per hour, thereby sweeping the molten zone in the same direction along the ingot 11. The furnace tube 16 also contains a small quartz boat 19 containing pure granular zinc 20. The zinc 20 is heated by a resistance heater (not shown) to a temperature of about 500° C., thus filling furnace 16 with zinc vapors. During the operation, a current of helium is swept through furnace 16 in the same direction as heater 17 travels (indicated by the arrow). Under these conditions, the molten zone distributes antimony from pellet 15 along the length of ingot 11, and at the same time silicon from wedge 13 is melted and incorporated into the ingot. The required amount of zinc atoms enter into the ingot by diffusing from the ambient of helium-zinc vapors into the molten zone. The ingot of material thus prepared has a silicon content which varies somewhat along its length, but the central portion of the ingot contains about 3.3 atomic percent silicon, and corresponds in composition to sample No. 3 in Table I above.

INFRA-RED DETECTOR DEVICES

Figure 3:
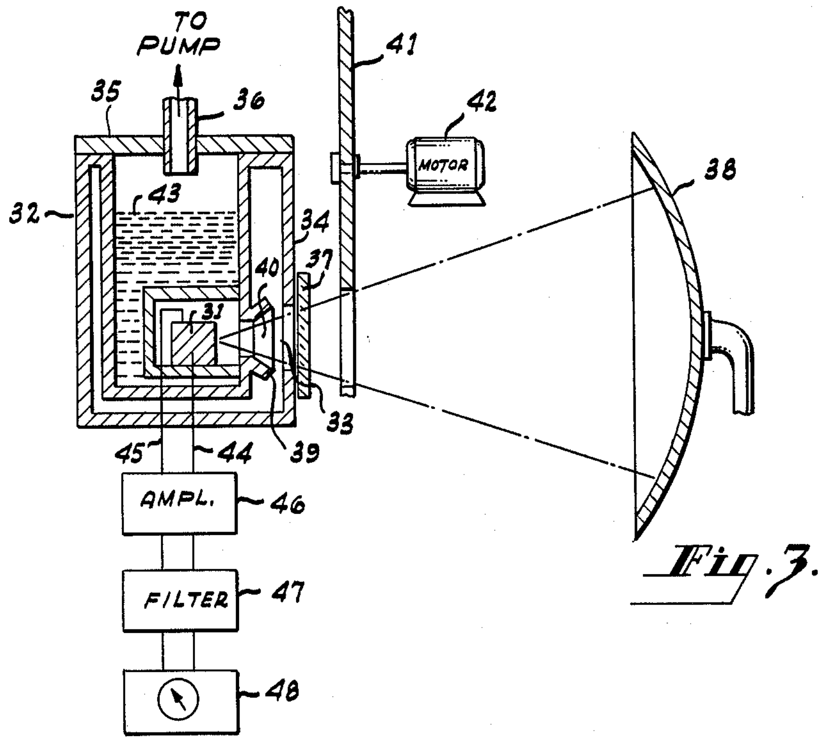

A typical device utilizing the doped germanium-silicon alloys disclosed herein is illustrated in FIGURE 3. A block 31 cut from a crystal of zinc plus antimony doped germanium-silicon alloy, containing for example 3.3 atomic percent silicon, as described heretofore, is soldered to an inner wall of a vacuum flask 32. The block 31 may conveniently be a cube about 0.5 cm. on a side and is made as large as is practical in order to provide maximum radiation absorption in the block. It is preferably placed within the vacuum chamber of the flask in order to minimize any contamination and heat loss that may affect it. A window 33 is cut in the outer wall 34 of the flask 32 opposite the block 31. In order to be able to control the pressure within the metal vacuum flask 32, a cover 35 is hermetically sealed to the top of the flask. Cover 35 is provided with a pipe 36 connecting the flask to a mechanical pump. The window 33 may be covered with any convenient infra-red radiation-transparent material 37 such as pure silicon or germanium or silver chloride or rock salt. The germanium or silicon window may be coated with a thin layer of silicon monoxide or zinc sulfide to reduce reflection losses. A pane of this material may be sealed in place by any convenient means such as wax or a cement. Germanium or silicon windows may be sealed by soldering with indium or tin, for example.

The block 31 is preferably sealed from all heat radiation except that which is directed upon it by the reflector 38. Shielding may be conveniently provided by the conical visor 39 having an aperture 40 aligned with the radiation window 33.

Infra-red radiation is directed upon the block 31 through pane 37 and window 33 by the reflector 38, which serves to concentrate received radiation and to provide sensing directivity. A chopping disc 41 driven by a motor 42 is provided adjacent the window 33 to interrupt the received signal periodically. Periodic interruption of the received signal is desirable because when subjected to pulsating radiation the device produces a constant amplitude or slowly modulated but rapidly pulsating signal which may be more readily amplified than a constant or slowly modulated D.C. signal.

The vacuum flask 32 is partially filled with liquid nitrogen 43 which serves to cool the wafer to a temperature of about 64° K. Although the temperature of liquid nitrogen is 77° K., such lower temperatures are readily attained by decreasing the pressure over the nitrogen by means of a vacuum pump, for example. Electrical leads 44 and 45 are connected to opposite sides of the block and serve to connect the crystal to an amplifier 46. The amplifier is provided with biasing means so that in effect it constantly measures the resistivity of the wafer and amplifies the change of conductivity produced in the wafer by the impressed radiation. The amplified signal is fed through a filter 47 designed to reduce noise, and the resulting output may be displayed on a meter 48 or any other convenient indicating device.

A device such as described above exhibits a fairly flat sensitivity (sensitivity one-half the peak value) to radiation from about 5 microns to about 13 microns, and has a useful sensitivity to about 14 microns. The degree of sensing directivity may be controlled according to known principles, for example by varying the size and shape of the reflector 38.

Infra-red sensing devices utilizing materials according to the instant invention may be conveniently operated at temperatures attainable with liquid nitrogen. Improved sensitivity may be obtained by operating such devices at temperatures which are substantially lower than those attainable with liquid nitrogen, i.e., temperatures substantially lower than 50° K., such as temperatures attainable with liquid helium. With somewhat decreased sensitivity in the longer wavelength regions, materials according to the invention may also be utilized in infra-red detection devices that operate at higher temperatures up to about 200° K.

There have thus been described improved semiconductive materials with improved sensitivity to infra-red radiations, methods of making these materials, and devices utilizing them.

What is claimed is:

1. A radiation-sensitive device including a body of crystalline germanium-silicon alloy containing 1 to 10 atomic percent silicon, said body having incorporated in its crystal lattice about $10^{14}$ to $10^{16}$ zinc atoms per cubic centimeter and from one to less than two times as many atoms per cubic centimeter of an element selected from the group consisting of phosphorus, arsenic, antimony, and bismuth.

2. A radiation-sensitive device including a body of crystalline germanium-silicon alloy containing 1–10 atomic percent silicon with electrodes connected thereto, said body having incorporated in its crystal lattice about $10^{14}$ to $10^{16}$ zinc atoms per cubic centimeter and at least an equal number of atoms per cubic centimeter of an element selected from the group consisting of phosphorus, arsenic, antimony, and bismuth.

3. A radiation-sensitive device including a body of crystalline germanium-silicon alloy with a silicon content of about 1 to 10 atomic percent, said body having incorporated in its crystal lattice sufficient zinc atoms and sufficient atoms of an element selected from the group consisting of phosphorus, arsenic, antimony, and bismuth to establish an ionization energy level of about .09 to .14 electron volt in said body.

4. A radiation-sensitive device including a body of crystalline germanium-silicon alloy with a silicon content of about 1 to 10 atomic percent, said body having incorporated in its crystal lattice sufficient zinc atoms and sufficient atoms of an element of the group consisting of phosphorus, arsenic, antimony, and bismuth to establish an ionization energy level of about 0.1 electron volt in said body.

5. In an infra-red radiation-sensitive device comprising means to maintain an infra-red sensitive element at a temperature of about 77° K. and below, means to expose said element to a desired radiation field, and means to measure resistivity changes in said element produced by exposure thereof to said radiation field, the improvement consisting in making said devices particularly sensitive to radiation having a wavelength of about 8–14 microns by forming said element of crystalline germanium-silicon alloy having a silicon content of about 1 to 10 atomic percent and having incorporated in its crystal lattice about $10^{14}$ to $10^{16}$ zinc atoms per cubic centimeter and about one to less than two times as many atoms per cubic centimeter of an element selected from the group consisting of phosphorus, arsenic, antimony, and bismuth.

References Cited in the file of this patent

UNITED STATES PATENTS

| | | |
|---|---|---|
| 2,547,173 | Rittner | Aug. 3, 1951 |
| 2,671,154 | Burstein | Mar. 2, 1954 |
| 2,692,950 | Wallace | Oct. 26, 1954 |
| 2,773,925 | Rothlein | Dec. 11, 1956 |
| 2,816,232 | Burstein | Dec. 10, 1957 |
| 2,844,737 | Hahn | July 22, 1958 |
| 2,860,218 | Dunlap | Nov. 11, 1958 |
| 2,860,219 | Taft et al. | Nov. 11, 1958 |
| 2,953,529 | Schultz | Sept. 20, 1960 |

OTHER REFERENCES

Conductivity in Semi-Conductors, by Lark-Horovitz, Electrical Engineering, December 1949, pages 1047 to 1056.

Infrared Photoconductivity Due to Neutral Impurities in Germanium, by Burstein et al., Physical Review, vol. 93, No. 1, January 1, 1954, pages 65 to 68.

Electrical Properties of Germanium-Silicon Alloys, by Levitas, Physical Review, vol. 99, No. 6, Sept. 15, 1955, pages 1810 to 1814.